Dec. 1, 1936.            F. W. OFELDT            2,062,925
                    GENERATION OF HEATED FLUIDS
                    Original Filed Jan. 17, 1933
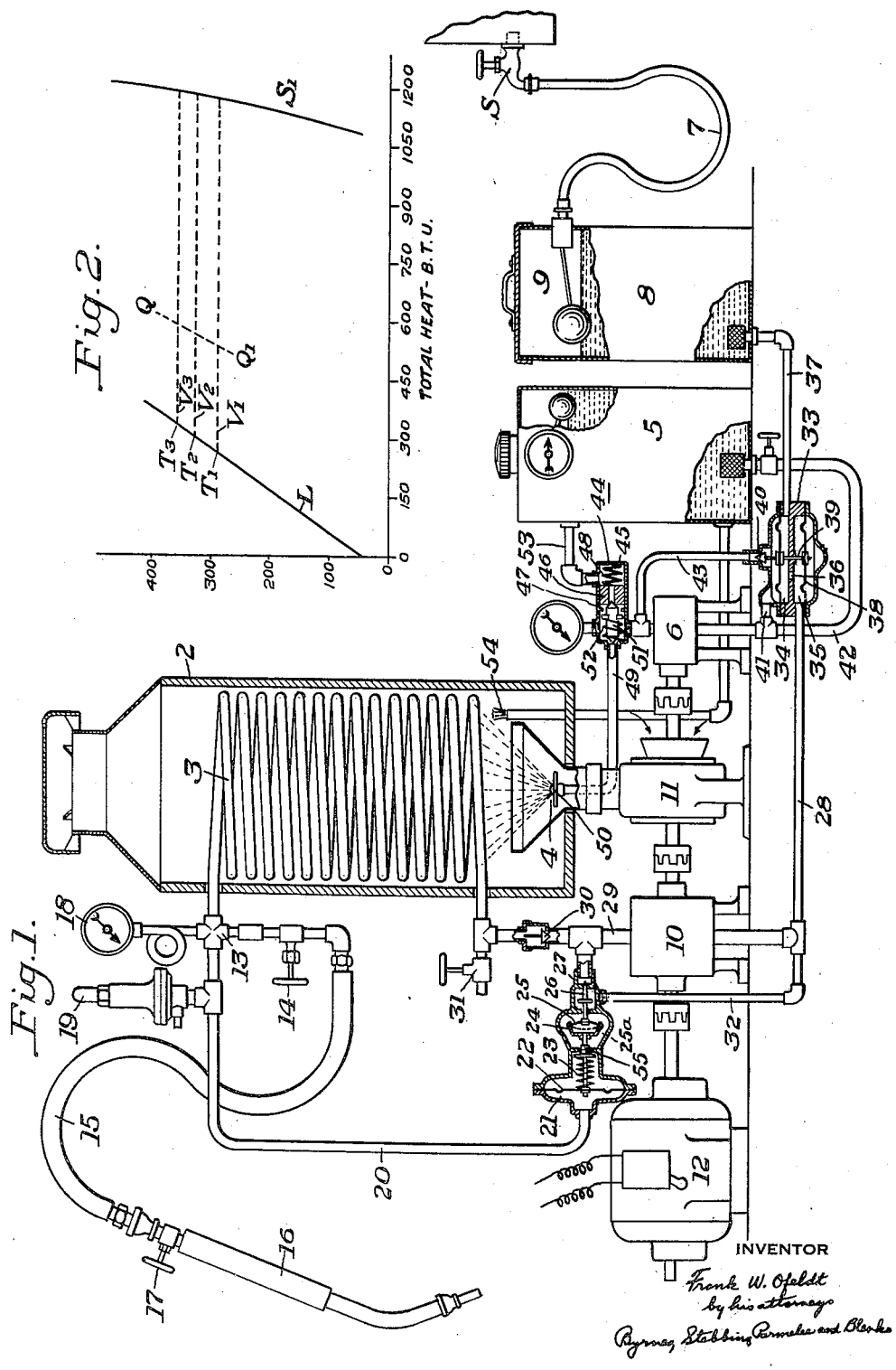

Patented Dec. 1, 1936

2,062,925

UNITED STATES PATENT OFFICE 2,062,925

GENERATION OF HEATED FLUIDS

Frank W. Ofeldt, McKeesport, Pa.

Application January 17, 1933, Serial No. 652,105
Renewed July 15, 1936

6 Claims. (Cl. 122—448)

This invention relates to the generation of heated fluids and provides a method and apparatus having a variety of important industrial applications.

I provide for the generation of a fluid which is a mixture of a liquid and a vapor of such liquid. As is well known, in the heating of a liquid, as, for example, water, the temperature rises with the addition of heat until the boiling point is reached. In order to further raise the temperature it is necessary to first add a quantity of heat—the latent heat of vaporization—thus transforming the liquid into steam, after which the supplying of additional heat raises the steam temperature. Water heaters operate on the liquid phase of the heating curve; that is to say, they ordinarily raise the temperature only to a point below the boiling point, the water remaining in the liquid phase at all times. Steam boilers, on the other hand, necessarily transform the fluid into its vapor phase because the purpose of the boiler is to supply steam. For a number of industrial purposes neither hot water alone nor steam alone is satisfactory. I have found that a mixture of liquid and the vapor of such liquid has numerous industrial applications, as, for example, spraying, heating, power generation, and hydration purposes. As a cleaning spray the mixture is very desirable. It has sufficient mass that when discharged against a surface to be cleaned it does the work thoroughly and at relatively low cost. On the other hand, it is not so hot that the surface being cleaned is adversely affected. Such a spray may also be used for disinfecting or as a germicidal or insecticidal spray. It may be used as a power spray for applying cement or stucco or for conveying sand or shot for blasting. It may also be used for humidifying, as, for example, in air conditioning green houses or the like. Various other uses, as, for example, heating of steam rooms, fire fighting purposes, and the like, suggest themselves. For heating purposes the mixture may be discharged into suitable vessels, such as cooking vessels, or it may be used for heating concrete in winter to prevent freezing. The mixture may be used in various ways for power purposes, as, for example, driving rotary engines for drills, tube cleaners and the like, operating liquid syphons or ejectors or aspirators for air and gases. For hydration purposes the mixture serves to aid in shaping or bending wood, bamboo, and the like, or hydration may be carried on simultaneously with utilization of the mixture for conveying, as, for example, in the conveying and/or hydrating of water-proofing compounds and the like.

In order to commercially utilize a mixture such as I contemplate it is necessary to make some provision for generating the same in quantity and uniformly at the desired quality. For certain purposes it may be desirable to use a mixture containing a given percentage of vapor, and for another purpose a different percentage will be preferable. It is therefore important to provide for automatically maintaining a desired percentage of vapor in the fluid mixture which is generated, and for setting such percentage as desired.

While it may be possible by the abnormal use of existing apparatus to obtain for limited periods of time and in limited quantities a fluid mixture such as I desire to obtain, it is difficult if not impossible with existing apparatus to obtain an accurately controlled mixture in large volume and over extended periods of time. The usual regulating devices are useless for my purpose since the generator must operate in the latent heat phase of the heating curve. Over this whole phase of the curve there is no change in temperature or pressure and hence ordinary temperature or pressure responsive devices, as usually connected, do not serve to control an apparatus in such manner that accurate proportioning of liquid and vapor is obtained.

I provide for passing of the liquid through a heating zone, there heating it to a point where a part only of the liquid is vaporized, thereby obtaining the desired mixture, and discharging such mixture of liquid and vapor into a zone of lower pressure. The control of quality is obtained by accurately proportioning the amount of heat supplied with the amount of liquid supplied to the heating zone. With a given apparatus it can readily be determined that for, say, every pound of water supplied to the heating zone per hour a certain amount of a given fuel must be supplied in order to heat it to the boiling point. The additional heat required to transform the water into dry and saturated steam may be readily determined and intermediate quantities of fuel will serve to not only heat the liquid to the boiling point but also to vaporize a fraction thereof, the percentage of liquid which is vaporized depending on the amount of fuel supplied over and above that required for raising the whole quantity to the boiling point.

The proportioning may be carried out in various ways and the fuel and liquid supplies may be continuous or intermittent so long as there are no such material variations in the rate of fuel and liquid supply as to interfere substantially with the proportioning of supplied heat to liquid which is to be heated.

In the accompanying drawing illustrating more or less diagrammatically a present preferred embodiment of the invention, Figure 1 is a diagrammatic view in side elevation, but partly broken away, illustrating an apparatus for carrying out my improved process; and Figure 2 is a diagram showing the heating of the liquid to a desired point in the latent heat range.

The apparatus shown in Figure 1 comprises a heater having a shell 2 which contains a heating coil 3 and a burner 4 supplied with oil fuel and arranged to supply heat to liquid in the coil 3. Fuel oil from a tank 5 is fed to the burner 4 by a pump 6. Water to be heated is fed from any source of supply, such as an outlet S, through a tube 7 to a tank 8 wherein the level is maintained constant by a float valve 9. The water is pumped from the tank 8 through connections hereinafter described by a pump 10 to the coil 3. Air for combustion is supplied to the burner 4 by a rotary blower 11. The pumps 6 and 10 and the blower 11 are all driven at constant speed by a motor 12. So long as the pump 10 is in operation it supplies a definite amount of liquid in unit time to the coil 3, and so long as the pump 6 is in operation it supplies a definite amount of fuel to the burner 4 in unit time (the exactitude of the fuel supply is insured by means hereinafter described). Consequently, the amount of heat supplied to the coil is proportioned to the amount of liquid supplied to it, and the proportions may be such as to impart to the liquid the amount of heat necessary to produce a mixture of liquid and vapor of desired quality.

The mixture leaving the coil 3 passes to a fitting 13 and thence through a valve 14 to a flexible hose 15 and a nozzle 16 having a hand valve 17 therein. The fitting 13 is connected to a pressure gauge 18 and a safety valve 19. A pipe 20 connects the outlet of the coil 3 with the pressure chamber 21 of a control valve. The pressure in the chamber 21 is communicated to a diaphragm 22 which is biased in one direction by a spring 23. The stem of the valve carries a yoke 24 which holds a flat spring 25. The spring, in turn, is connected to the needle 26 of a bypass valve 27. When the pump 10 is supplying water to the coil 3 it draws the water from a pipe 28 and discharges it through a pipe 29 past a check valve 30 to the coil. A drain cock 31 is provided above the check valve 30. The bypass valve 27 is connected to the pipe 29. When the needle 26 is seated all of the pumped liquid necessarily goes to the coil 3. When the valve is opened then the pumped liquid is bypassed through the valve 27 to a return pipe 32 leading back to the supply pipe 28. If the fluid is withdrawn from the heating coil 3 at a rate less than the rate of generation the pressure in the coil will quickly build up and the diaphragm 22 will be forced to the right as viewed in Figure 1. It will be noted that at this time the valve needle 26 is seated. As the diaphragm moves to the right against the pressure of the spring 23, the leaf spring 25 is flexed until, as is well known in this type of valve, a dead center point is reached, whereupon the spring assumes the dotted line position 25a, thereby opening the valve 26. This causes bypassing of the liquid and continued withdrawal of the mixture from the system rapidly brings about a diminution in pressure. When the pressure is sufficiently reduced the spring 23 moves the diaphragm 22 and the attached yoke 24 to the left, thereby again flexing the leaf spring 25. When it crosses the dead center point it snaps to the solid line position of the drawing, thereby closing the valve 27 and causing liquid to again travel to the coil 3.

It is necessary to effect a regulation of the fuel oil which will correspond with the regulation of the water supply. This is done by a control valve 33. The control valve has an upper chamber 34 and a lower chamber 35 connected by a restricted opening 36. The water supply pipe 28 is connected to the lower chamber 35, while the upper chamber is connected through a pipe 37 to the water tank 8. Hence all of the water which is pumped must pass through the pipe 37 to the valve chamber 34, thence through the restricted opening 36 to the lower valve chamber 35 and thence to the pipe 28. There is a diaphragm 38 in each of the valve chambers, these diaphragms being connected by a valve stem 39 controlling a bypass valve 40. The bottom face of the diaphragm in the lower valve chamber 35 is open to atmospheric pressure, but the upper face of the diaphragm in the upper valve chamber 34 is connected at 41 to the suction pipe 42 which extends from the oil tank 5 to the pump 6. When water is being pumped to the coil 3 by the pump 10, there is a pressure drop due the restricted orifice 36 and the net result of the water pressure on the lower diaphragm 38, the somewhat higher water pressure on the upper diaphragm, the pressure in the oil supply pipe and the atmospheric pressure on the lower diaphragm, is to keep the bypass valve 40 closed against the delivery pressure of the pump 6. However, when the needle valve 26 is opened so that the pump 10 is merely recirculating water and is not pumping any to the coil, the pressure drop across the orifice 36 becomes negligible and there is sufficient pressure in a pipe 43 (described below) to cause the valve 40 to open, thereby allowing the discharged oil from the pump 6 to bypass through the pipe 43. When the needle valve 26 closes the pressure on top of the lower diaphragm 38 is reduced, the valve 40 closes and the pump 6 again supplies oil to the burner 4. A burner control valve indicated generally by the reference character 44 is interposed between the pump 6 and the burner 4. This valve consists of a body 45 having a sliding plug 46 therein which is normally urged against stop 47 by a relatively heavy spring 48. The body 44 is open at the left-hand end as viewed in the drawing to make connection with the supply pipe 49 leading to a calibrated nozzle 50 in the burner. A double ended valve needle 51 lies in the left-hand end of the housing and is provided with a relatively light spring 52 which opposes the spring 48. The stop 47 limits the movement of the plug 46 to the left and also limits the movement of the needle 51 to the right as will be apparent from the drawing. This valve serves several functions. As soon as the bypass valve 40 is opened the pressure on the delivery side of the pump begins to drop and immediately it drops below the point required for proper atomization of the fuel the plug 46, urged to the left by the spring 48, presses the needle 51 against the seat at the left-hand end of the valve body 44, thus sharply cutting off all oil flow to the burner. When the bypass valve 40 is again closed and the pumping of oil to the burner is resumed, the pressure builds up in the valve body 44 sufficiently to overcome the resistance of the spring 48. The plug 46 thereupon moves to the right and the spring 52 causes the needle valve 51 to follow up the plug, thereby opening the passage to the burner. The valve 44 serves as a pressure relief valve and bypasses to the tank 5 all oil supplied by the pump 6 over and above that required by the calibrated jet 50. Any building up of pressure in the chamber of the valve 44 which naturally results from a supply of fuel in excess of what can be handled by the calibrated nozzle 50 results in the plug 46 being urged to the right. As stated, the spring 52 causes the needle valve to follow up the plug, but when a certain pressure is reached the movement of the needle valve to the right is limited by the stops 47; thereupon the plug 46 moves further to the right away from the needle valve 51, thereby opening the passage through the middle of the plug 46, whereby the excess oil is free to pass to the right-hand end of the valve body 44 and thence through the pipe 53 to the tank 5.

This valve also provides a constant escape to the tank 5 of a very small amount of fuel. This escape is due to leakage around the plug 46. This escape of fuel eliminates any air pockets and prevents the pump from becoming air bound.

While the simultaneous pumping of water and fuel is obtained by the above described control, the exact proportioning of water and fuel is obtained by the calibrated burner nozzle 50 which always supplies fuel at a definite maximum rate. This rate can be varied by changing the orifice in the jet or the pressure on the spring 48. Normally, however, it will be expected that the jet itself will be changed. It will be noted that the needle valve 26 is so controlled that either the entire discharge of the pump 10 is supplied to the coil 3 or the entire discharge is bypassed. Likewise the valve 40 will in operation lie either fully open or fully closed, and the burner 4, therefore, will be burning fuel up to the capacity of the calibrated nozzle 50 or else will be turned off entirely. A pilot 54 serves to light the atomized fuel.

The pressure in the system can be determined by a regulating screw 55 which controls the pressure exerted by the spring 23 against the diaphragm 22.

It will be seen from the above description that a definite relationship between quantity of fuel and liquid is always maintained. Figure 2 illustrates the heating curve for water and illustrates the operation of the device. In Figure 2 the total heat of the fluid in B. t. u.'s is plotted against the temperature in degrees Fahrenheit. When the water reaches the coil 3 and begins to absorb heat it follows the liquid line L until it reaches a temperature corresponding to the pressure determined by the regulation of the adjusting screw 55. I have indicated in the diagram for purposes of illustration only three lines $V_1$, $V_2$ and $V_3$ illustrating the vapor phase of the curve for various pressures corresponding to temperatures $T_1$, $T_2$ and $T_3$. If the apparatus is maintained at any one of such pressures and it were possible to supply a sufficient amount of heat, the total latent heat of vaporization for the amount of liquid present would be taken up by the water and thereafter the heating would continue on the steam line $S_1$ until the whole quantity of liquid was transformed into dry and saturated steam, after which superheating would occur. As a matter of fact, however, the apparatus is so designed that only a portion of the latent heat is supplied. I have indicated a line $Q$—$Q_1$ on the diagram as an example to show where the heating terminates. In the case of the particular line $Q$—$Q_1$, the quality of the fluid as discharged from the coil 3 is approximately 25 percent; that is to say, 75 percent of the fluid remains in the liquid phase and 25 percent has been transformed into steam. By changing the burner nozzle any desired quality can be obtained. I have found that a quality of 20 to 30 percent is useful for most cleaning purposes. For spraying purposes there is sufficient mass to the spray to effect the desired results and there is sufficient vapor in it to insure that the proper amount of heat is present.

A great advantage of my invention lies in the fact that various substances may be introduced into the fluid wherever desired. It may be desirable, for example, to place a cleaning compound in the supplied liquid. This may be readily done, and tests show that there is no danger of scale being deposited in the coil 3 and plugging it. It may be desirable to add some substance to the fluid at the outlet of the apparatus or at the nozzle, as, for example, waterproofing compounds, cement and the like. The proportions of liquid vapor may, as stated, be changed as desired and the pressure may also be varied. The operation of the apparatus is automatic and once set to supply a given quality of fluid will continue to supply the same in amounts up to the capacity of the apparatus as long as it is kept in operation. If the requirements are less than the total capacity, the consequent throttling of the outlet does not change the quality of the fluid produced but simply results in a diminution of its quantity.

It will thus be seen that by my improved method and apparatus I am able to pass liquid through the heating zone at a rate which corresponds substantially to the rate of withdrawal from the device, the supply being interrupted momentarily from time to time in order to adjust the rate of inflow to the rate of withdrawal. I am further able to maintain in the heating zone a pressure above that into which the fluid is to be discharged and to supply enough heat that the discharged liquid is at a temperature above the boiling point of the liquid at the pressure into which the liquid is discharged. The burner is effective for supplying heat to the zone at a rate proportioned to the rate of liquid supply and in such amount that there is imparted to the liquid a heat content corresponding to a point in the latent heat range of the liquid at its then pressure. For a wide variety of uses the device will discharge the heated fluid to the atmosphere as a spray, but it will be understood that it may discharge into sub-atmospheric or super-atmospheric pressures and that the pressure in the heating zone may be adjusted to give a pressure having the desired excess over the pressure into which the device is to be discharged. The mixture may, of course, be used otherwise than as a spray, various uses having been indicated above. It will be further understood that various compounds as, for example, cleaning compounds, may be added to the liquid. Such compound may be put in solution in the tank 8 or it may be added in solid or liquid form at the outlet of the machine, or at the nozzle.

While I have illustrated and described the present preferred embodiment of the invention, it is to be understood that the invention is not so limited but may be otherwise embodied and practiced within the scope of the following claims.

I claim:

1. Liquid heating apparatus comprising a container for the liquid to be heated, a burner for supplying heat thereto, a pump for supplying liquid to the container, a pump for supplying fuel to the burner, and means responsive to the rate of liquid delivery for controlling the amount of fuel delivered to the burner, said means including a by-passing valve for the fuel supply pump, said valve having surfaces responsive to the pressures on the liquid supplied by the first mentioned pump before and after traversing a restricted opening.

2. Liquid-heating apparatus comprising a heating coil, heating means cooperating therewith, a pump supplying liquid to the coil, a by-pass for the pump, a valve controlling the by-pass, said valve including a closure movable to and from closed position, pressure responsive means to move the closure toward closed position, and snap action means between the closure and pressure responsive means effective on predetermined movement of the pressure responsive means to cause movement of the closure from closed to open position.

3. In an apparatus for heating a fluid, the combination of means for supplying a predetermined amount of fluid to said apparatus, means for supplying fuel to said apparatus at a rate correlated with the rate of supplying fluid, and means independent of the above mentioned means and actuated by the pressure of the fluid for simultaneously controlling the stopping and starting of the supply of said fluid and fuel to said apparatus.

4. In an apparatus for heating a fluid, the combination of means for supplying a predetermined amount of fluid to said apparatus, means for supplying fuel to said apparatus at a rate correlated with the rate of supplying fluid, means independent of the above mentioned means and actuated by the pressure of the fluid for controlling the stopping and starting of the supply of fluid to said apparatus, and means actuated by the pressure of the fluid for controlling the stopping and starting of the supply of fuel to said apparatus.

5. In an apparatus for heating a fluid, the combination of means for supplying a predetermined amount of fluid to said apparatus, means for supplying fuel to said apparatus at a rate correlated with the rate of supplying fluid, means independent of the above mentioned means and actuated by the pressure of the fluid for controlling the stopping and starting of the supply of fluid to said apparatus, and means responsive to the rate of flow of the fluid for controlling the stopping and starting of the supply of fuel to said apparatus.

6. In an apparatus for heating a fluid, the combination of means for supplying a fluid to the apparatus at a predetermined rate, means for supplying fluid fuel to said apparatus for heating the first mentioned fluid, at a rate correlated with the rate of supplying the first mentioned fluid, and means independent of the aforesaid means for varying the pressure under which one of said fluids is supplied for controlling the quantitative relation between the supplied fluid and the supplied fluid fuel.

FRANK W. OFELDT.